(12) United States Patent
Hu et al.

(10) Patent No.: US 11,728,675 B2
(45) Date of Patent: Aug. 15, 2023

(54) POWER SUPPLY APPARATUS

(71) Applicant: DELTA ELECTRONICS, INC., Taoyuan (TW)

(72) Inventors: Kai-Wei Hu, Taoyuan (TW); Yen-Hsun Chen, Taoyuan (TW); Chia-Tse Lee, Taoyuan (TW); Lei-Chung Hsing, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/720,462

(22) Filed: Apr. 14, 2022

(65) Prior Publication Data

US 2023/0006465 A1    Jan. 5, 2023

Related U.S. Application Data

(60) Provisional application No. 63/216,846, filed on Jun. 30, 2021.

(30) Foreign Application Priority Data

Dec. 28, 2021 (CN) .......................... 202111623170.1

(51) Int. Cl.
*H02J 9/06* (2006.01)
*H02J 7/00* (2006.01)
*H02J 7/02* (2016.01)

(52) U.S. Cl.
CPC ............ *H02J 9/062* (2013.01); *H02J 7/0013* (2013.01); *H02J 7/02* (2013.01)

(58) Field of Classification Search
CPC ....................................................... H02J 9/06
See application file for complete search history.

(56) References Cited

U.S. PATENT DOCUMENTS

| 2011/0187197 A1* | 8/2011 | Moth | H02J 9/062 |
| | | | 307/66 |
| 2017/0294782 A1* | 10/2017 | Navarro | H02M 3/04 |
| 2018/0034280 A1* | 2/2018 | Pedersen | H02J 3/38 |
| 2022/0302848 A1* | 9/2022 | Yu | H02M 1/36 |

FOREIGN PATENT DOCUMENTS

| TW | 201318297 A | 5/2013 |
| TW | M495032 U | 2/2015 |

\* cited by examiner

*Primary Examiner* — Jared Fureman
*Assistant Examiner* — Esayas G Yeshaw
(74) *Attorney, Agent, or Firm* — Muncy, Geissler, Olds & Lowe, P.C.

(57) ABSTRACT

A power supply apparatus is coupled to an AC power source, a critical load, and a general load. The power supply apparatus includes a UPS, a generator system, a power conversion system, and a controller. The power conversion system includes a first power conversion path and a second power conversion path. The first power conversion path is connected to the critical load and an output side, and the second power conversion path is connected to the general load and an input side. The first power conversion path and the second power conversion path are jointly connected to a DC bus. When the controller determines that the AC power source is abnormal, the controller controls disconnecting the AC power source, and activates the UPS to supply power to the critical load so as to enable the first power conversion path and disable the second power conversion path.

20 Claims, 15 Drawing Sheets

POWER SUPPLY APPARATUS

CROSS-REFERENCE TO RELATED APPLICATION

This patent application claims the benefit of U.S. Provisional Patent Application No. 63/216,846, filed Jun. 30, 2021, which is incorporated by reference herein.

BACKGROUND

Technical Field

The present disclosure relates to a power supply apparatus, and more particularly to a power supply apparatus with operations of a grid connection mode, a standalone mode, and a black start mode without using a battery energy storage device in a system.

Description of Related Art

The statements in this section merely provide background information related to the present disclosure and do not necessarily constitute prior art.

With the development of the economy, users' requirements for uninterrupted power supply and power supply quality are also increasing. Traditional centralized power supply is not easy to build large-scale power plants and power transmission and distribution systems, which makes be difficult to implement plans to enhance the reliability of the power system. In addition, earthquakes, typhoons, and other natural disasters caused continuous power outages.

In recent years, due to the development of new power generation technologies and the changes in the competition mechanism of the electricity industry, power generation equipment has developed diversified and is no longer limited to the development of large-scale centralized power generation. Therefore, decentralized power generation systems have begun to receive great attention.

There are many types of power sources in distributed power generation systems. Besides solar, wind and other renewable energy power generation, diesel engine generators, micro-turbine generators, etc. can be applied to this system. In particular, the micro-turbine generator is a technology suitable for decentralized power generation systems and micro-grids due to its small size, low pollution, easy installation, operation and maintenance, and development potential.

When using a micro-turbine generator in a distributed power generation system, there are two operation modes: a grid connection mode and a standalone mode, depending on whether it is connected with the power system. In addition, in consideration of the operation of the system, the start (activation) function of each operation mode is also required.

Please refer to FIG. 1, which shows a block diagram of a related-art turbine generator system. The turbine generator system includes a micro turbine 101, a generator 102, a DC-AC converter 103 of driving the generator, AC-DC converters 1051,1052 of active front-end conversion, a DC-DC converter 111 of battery conversion, a battery set (pack) 112, and a system controller 110. The system can achieve the grid connection mode (shown in FIG. 2) and the standalone mode (shown in FIG. 3) through the connection/disconnection of contact switches 1061,1062,1063 on the output circuit. In addition, when the system occurs failure under the grid connection mode, the system controller 110 will first stop the micro-turbine generator in operation, switch the contact switches of the output circuit, and then restart the micro-turbine generator to make it operate in the standalone mode.

As shown in FIG. 2, when the micro-turbine generator system operates in the grid connection mode, all the contact switches 1061,1062,1063 are in the turned-on state. In this condition, the micro-turbine generator system refers to the voltage and frequency of a mains 107, and its operation is similar to a current source, and the power electricity generated from the micro-turbine generator set is fed to the mains to supply power to a general load 108 and a critical load 109.

As shown in FIG. 3, when the micro-turbine generator system operates in the standalone mode, since it does not need to be connected with the mains 107, the contact switch 1061 at the mains side is in the turned-off state, as shown by dotted lines in FIG. 3. In this condition, the micro-turbine generator system forms an independent operation system controlled by a voltage source, and supplies the generated power electricity to the general load 108 and the critical load 109. However, when the standalone mode is activated (started), since there are no mains as an external power source for starting the generator set, the battery pack 112 and the DC-DC converter 111 (also referred to as a battery converter) are installed on the DC bus 104 as a backup power source for activating (starting) the standalone mode. The additional battery pack 112 and the battery converter 111 can also provide electrical energy buffering when the energy supply and demand between the electrical load and the turbine generator is unbalanced. For example, when the electrical load sharply rises, the electrical load is first supplied by the battery pack 112 through the battery converter 111, and then the power generation of the turbine generator is increased to balance the electrical load demand and replenish energy to the battery pack 112. Therefore, it can avoid the risk of generator system failure due to excessive power extraction from the turbine generator in a short period of time, resulting in excessive reduction of the generator speed.

In summary, in the micro-turbine generator system described above, the use of battery energy storage device composed of the battery pack 112 and the battery converter 111 will result in a substantial increase in the cost of system construction, and the maintenance cost of battery energy storage device is relatively expensive. On the contrary, if the battery energy storage device is not used, there will be no backup power supply in the micro-turbine generator system for use when starting in standalone mode.

In addition, under the absence of the battery energy storage device, when the system faces sudden changes in the electrical load, since there is no battery pack to provide an electrical energy buffer for unbalance energy supply and demand between electrical load and micro-turbine generator, the micro-turbine generator will face the risk that the instantaneous speed change is too large and the turbo generator system will fail.

SUMMARY

An object of the present disclosure is to provide a power supply apparatus to solve the problems of existing technology. In order to achieve the above-mentioned object, the power supply apparatus is coupled to an AC power source, a critical load, and a general load, and the power supply apparatus includes an uninterruptible power system, a generator system, a power conversion system, and a controller.

The uninterruptible power system includes an input side and an output side. The input side is connected to the AC power source and the general load, and the output side is connected to the critical load. The generator system includes a DC bus.

The power conversion system includes a first power conversion path and a second power conversion path. A first end of the first power conversion path is connected to the critical load and the output side, a first end of the second power conversion path is connected to the general load and the input side, and a second end of the first power conversion path and a second end of the second power conversion path are jointly connected to the DC bus. The controller controls disconnecting the AC power source, activates the uninterruptible power system to supply power to the critical load, enables the first power conversion path, and disables the second power conversion path when the controller determines that the AC power source is abnormal. The uninterruptible power system builds an ignition voltage on the DC bus through the first power conversion path to activate the generator system.

In one embodiment, after the generator system is completely activated, the controller disables the first power conversion path, and the generator system builds a working voltage on the DC bus.

In one embodiment, after the working voltage is built on the DC bus, the controller enables the second power conversion path.

In one embodiment, after the second power conversion path is enabled, the generator system supplies power to the general load through the second power conversion path, and then the second power conversion path and the uninterruptible power system supply power to the critical load.

In one embodiment, when the generator system supplies power to the critical load through the second power conversion path and the uninterruptible power system, the controller controls the uninterruptible power system operating in a standby mode, and the generator system charges at least one battery of the uninterruptible power system.

In one embodiment, when the controller determines that the AC power source is abnormal and before the first power conversion path is enabled, the controller controls to stop the operation of the generator system.

In one embodiment, when the controller determines that the AC power source is restored, the controller suspends the operation of the power supply apparatus. During the suspension of operation of the power supply apparatus, the controller enables the second power conversion path and disables the first power conversion path to operate in a grid connection mode. After the operation of the grid connection mode, the controller restores the operation of the power supply apparatus so that the AC power source and the generator system supply power to the critical load and the critical load.

In one embodiment, the controller controls the uninterruptible power system operating in a standby mode, and the AC power source and the generator system charge at least one battery of the uninterruptible power system.

In one embodiment, the power supply apparatus further includes a capacitor bank. The capacitor bank is connected to the DC bus of the generator system to stabilize a rotation speed of the generator system.

In one embodiment, the first power conversion path includes a first switch and a first power converter; a first end of the first switch is used as the first end of the first power conversion path, a second end of the first switch is connected to a first end of the first power converter, and a second end of the first power converter is used as the second end of the first power conversion path. The second power conversion path includes a second switch and a second power converter; a first end of the second switch is used as the first end of the second power conversion path, a second end of the second switch is connected to a first end of the second power converter, and a second end of the second power converter is used as the second end of the second power conversion path. The controller controls the first switch to enable or disable the first power conversion path, and controls the second switch to enable or disable the second power conversion path.

In one embodiment, the first power conversion path includes a first switch and a power converter, and the second power conversion path includes a second switch and the power converter. A first end of the first switch is used as the first end of the first power conversion path, a first end of the second switch is used as the first end of the second power conversion path, a second end of the first switch and a second end of the second switch are jointly connected to a first end of the power converter, and a second end of the power converter is used as the second end of the first power conversion path and the second end of the second power conversion path. The controller controls the first switch to enable or disable the first power conversion path, and controls the second switch to enable or disable the second power conversion path.

Accordingly, the power supply apparatus of the present disclosure provides operations of a grid connection mode, a standalone mode, and a black start mode without using a battery energy storage device in a system.

Another object of the present disclosure is to provide a power supply apparatus to solve the problems of existing technology. In order to achieve the above-mentioned object, the power supply apparatus is coupled to an AC power source, a critical load, and a general load. The power supply apparatus includes an uninterruptible power system, a generator system, a contact switch, a power converter, and a controller. The uninterruptible power system includes an input side and an output side. The input side is connected to the AC power source and the general load, and the output side is connected to the critical load. The generator system includes a DC bus. The contact switch includes a first end, a second end, a third end, and a fourth end. The first end is connected to the critical load and the output side, the second end is a floating end, the third end is connected to the general load and the input side, and the fourth end is selectively connected to one of the first end, the second end, and the third end. The power converter is connected between the fourth end and the DC bus. The controller disconnects the AC power source, activates the uninterruptible power system to supply power to the critical load, and controls the fourth end connecting to the first end when the controller determines that the AC power source is abnormal. The uninterruptible power system builds an ignition voltage on the DC bus through the first end, the fourth end, and the power converter to activate the generator system.

In one embodiment, after the generator system is completely activated, the controller controls the fourth end connecting to the floating end, and the generator system builds a working voltage on the DC bus.

In one embodiment, after the working voltage is built on the DC bus, the controller controls the fourth end connecting to the third end.

In one embodiment, after the fourth end is connected to the third end, the generator system supplies power to the general load through the power converter, the fourth end, and the third end, and then the uninterruptible power system supplies power to the critical load.

In one embodiment, when the generator system supplies power to the critical load through the uninterruptible power system, the controller controls the uninterruptible power system operating in a standby mode, and the generator system charges at least one battery of the uninterruptible power system.

In one embodiment, when the controller determines that the AC power source is abnormal and before the fourth end is connected to the first end, the controller controls to stop the operation of the generator system.

In one embodiment, when the controller determines that the AC power source is restored, the controller suspends the operation of the power supply apparatus. During the suspension of operation of the power supply apparatus, the controller controls the fourth end connecting to the third end to operate in a grid connection mode. After the operation of the grid connection mode, the controller restores the operation of the power supply apparatus so that the AC power source and the generator system supply power to the critical load and the critical load.

In one embodiment, the controller controls the uninterruptible power system operating in a standby mode, and the AC power source and the generator system charge at least one battery of the uninterruptible power system.

In one embodiment, the power supply apparatus further a capacitor bank. The capacitor bank is connected to the DC bus of the generator system to stabilize a rotation speed of the generator system.

Accordingly, the power supply apparatus of the present disclosure provides operations of a grid connection mode, a standalone mode, and a black start mode without using a battery energy storage device in a system.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
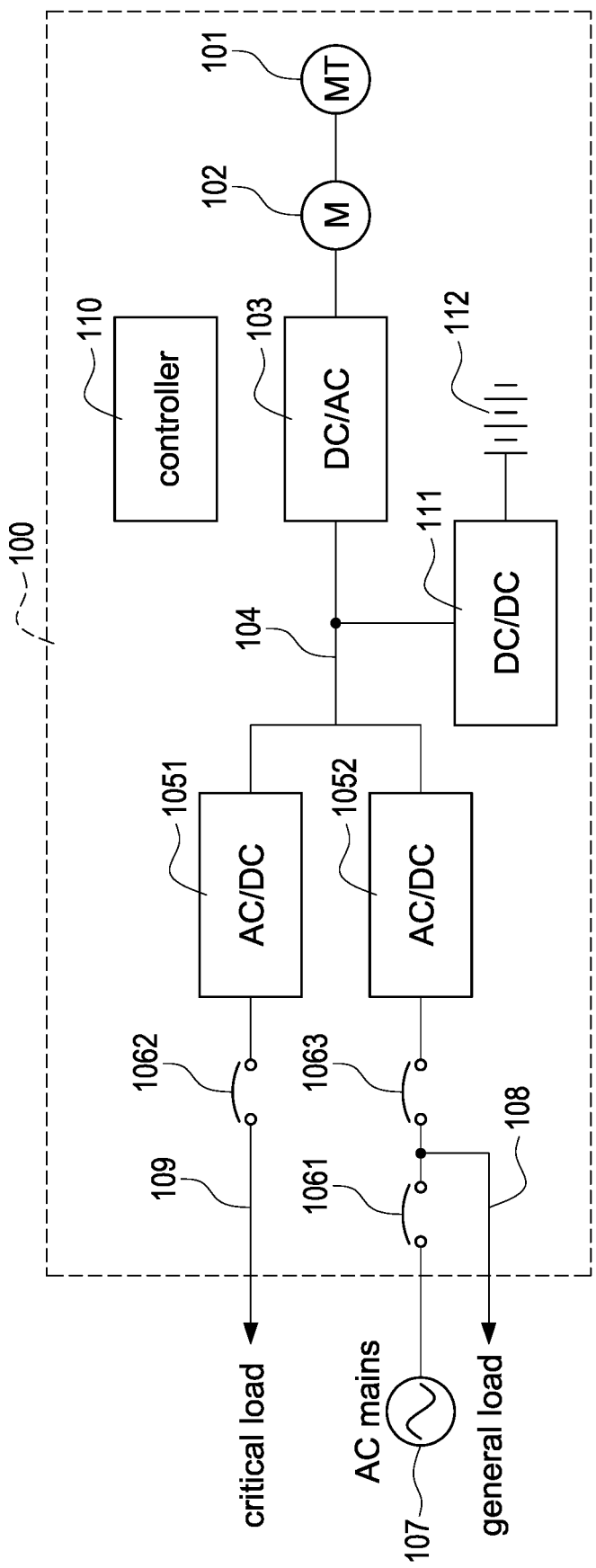
FIG. 1 is a block diagram of a related-art turbine generator system.
Figure 2:
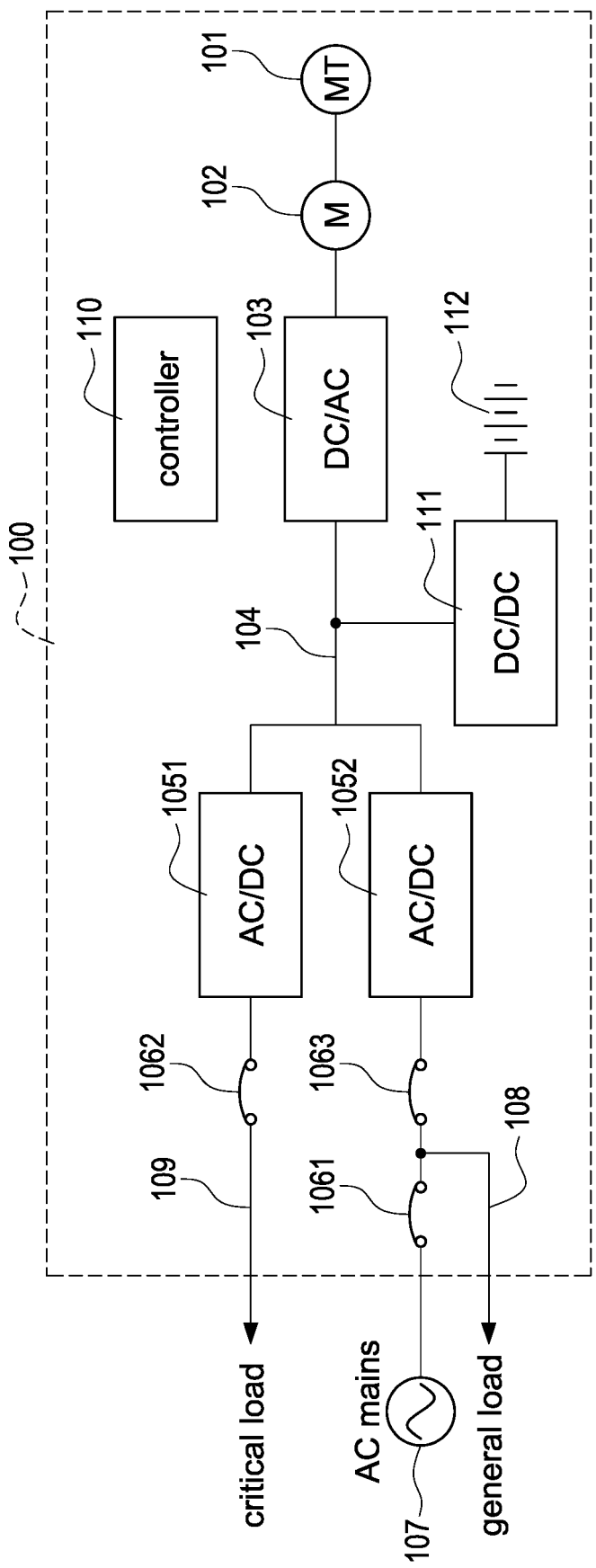
FIG. 2 is a block diagram of the related-art turbine generator system operating in a grid connection mode.
Figure 3:
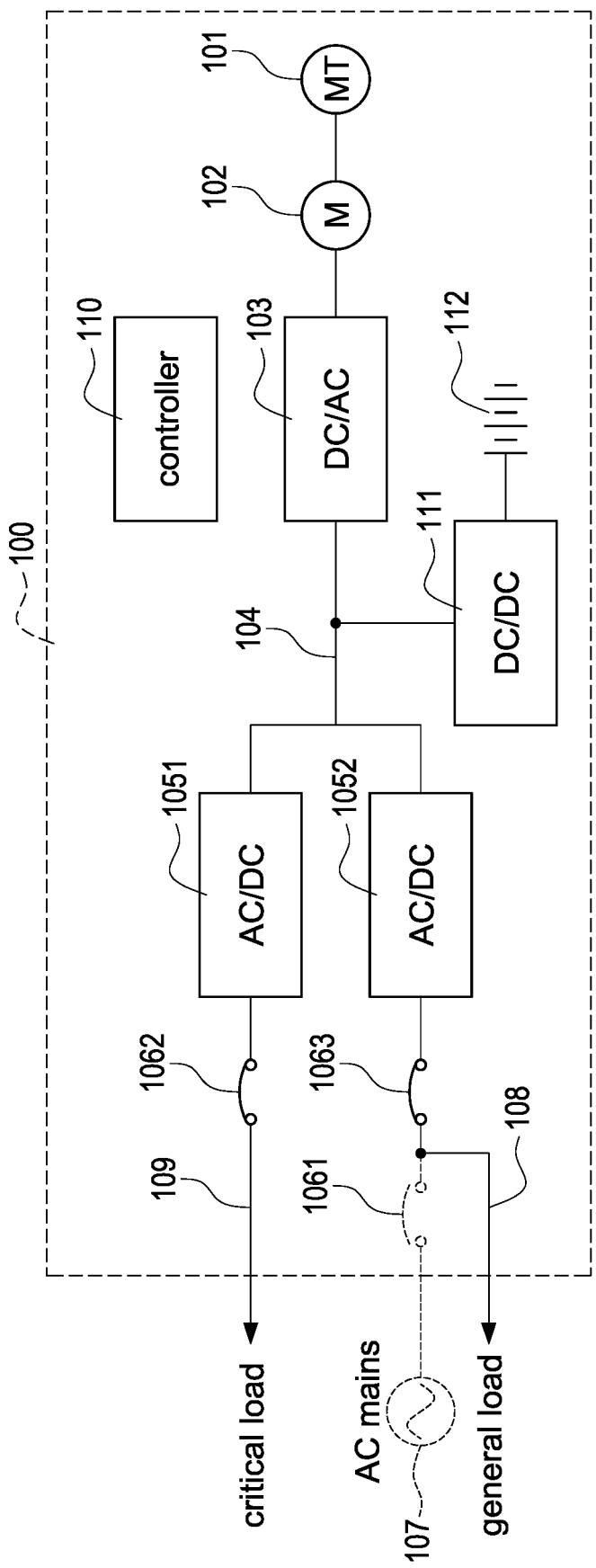
FIG. 3 is a block diagram of the related-art turbine generator system operating in a standalone mode.

Reference will now be made to the drawing figures to describe the present disclosure in detail. It will be understood that the drawing figures and exemplified embodiments of present disclosure are not limited to the details thereof.

In response to the above technical problems, the present disclosure provides a micro-turbine generator system without using a battery energy storage device built (connected) on a DC bus in the system. The turbine generator system includes a micro turbine, a generator, a DC-AC converter of driving the generator, an AC-DC converter of active front-end conversion, an uninterruptible power system (UPS), an AC-side output configuration circuit, a capacitor bank, and a system controller. In order to ensure that the micro-turbine generator system has the starting function of the standalone mode, the present disclosure uses an uninterrupted power system, combined with the switching of the contact switches of the AC-side output circuit so as to complete the black start operation of the standalone mode.

In addition, when the system of the present disclosure faces sudden changes in the electrical load, the electrical energy buffer function of the unbalanced energy supply and demand between the electrical load and the micro-turbine generator will be provided by the capacitor bank so that it is possible to avoid the generator system failure due to excessive changes in the rotation speed of the turbine generator.

Due to the absence of the battery energy storage device, the uninterruptible power system and capacitor bank with mature technology, low cost and easy maintenance are used instead as the backup power supply when the system is started in the standalone mode and the electrical energy buffer device when the electrical load changes. Therefore, the micro-turbine generator system of the present disclosure has the characteristics of low cost and easy maintenance, and ensures that it has functions such as a grid connection mode, a standalone mode, and a black start mode.

Figure 4:
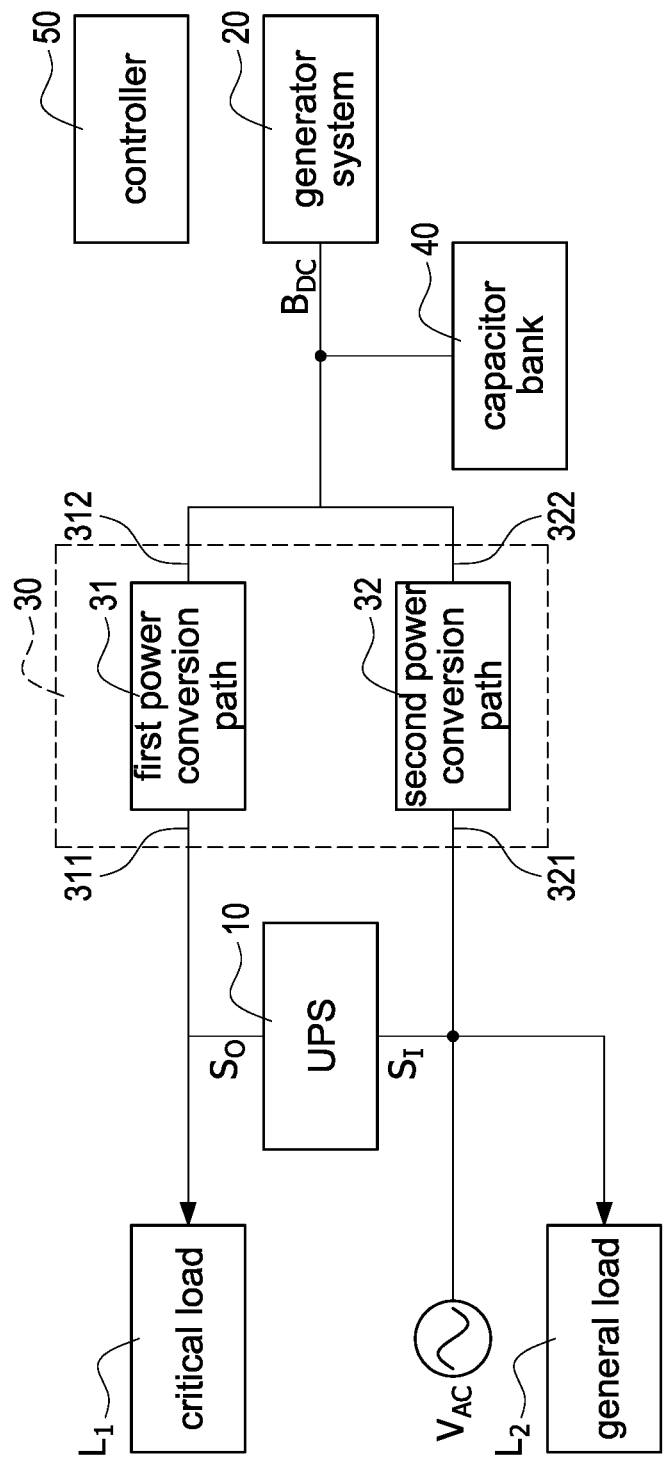
FIG. 4 is a block diagram of a power supply apparatus according to a first embodiment of the present disclosure.

Please refer to FIG. 4, which shows a block diagram of a power supply apparatus according to a first embodiment of the present disclosure. The power supply apparatus is coupled to an AC power source $V_{AC}$, a critical load $L_1$, and a general load $L_2$. The AC power source $V_{AC}$ may be a single-phase or three-phase AC power source. In particular, the critical load $L_1$ is usually an important load for system priority, emergency, or uninterrupted power supply. Compared with the critical load $L_1$, the general load $L_2$ is a less important load.

The power supply apparatus includes an uninterruptible power system (UPS) 10, a generator system 20, a power conversion system 30, and a controller 50. The uninterruptible power system 10 is a device used to continuously provide backup AC power to the load when the AC power source $V_{AC}$ is abnormal (such as power failure, under voltage, over voltage, etc.) so as to maintain the normal operation of the load. The uninterruptible power system 10 includes an input side $S_I$ and an output side $S_O$. The input side $S_I$ is connected to the AC power source $V_{AC}$ and the general load $L_2$, and the output side $S_O$ is connected to the critical load $L_1$.

The generator system 20 includes a DC bus $B_{DC}$. The power conversion system 20 includes a first power conversion path 31 and a second power conversion path 32. A first end 311 of the first power conversion path 31 is connected to the critical load $L_1$ and the output side $S_O$. A first end 321 of the second power conversion path 32 is connected to the general load $L_2$ and the input side $S_I$, and a second end 312 of the first power conversion path 31 and a second end 322 of the second power conversion path 32 are jointly connected to the DC bus $B_{DC}$. The generator system 20 disclosed in the present disclosure is actually a micro turbine generator, but the present disclosure is not limited to this.

When the controller 50 determines that the AC power source $V_{AC}$ is abnormal, the controller 50 controls disconnecting the AC power source $V_{AC}$, activates the uninterruptible power system 10 to supply power to the critical load $L_1$, enables the first power conversion path 31, and disables the second power conversion path 32. Therefore, the uninterruptible power system 10 builds an ignition voltage on the DC bus $B_{DC}$ through the first power conversion path 31 to activate the generator system 20. Moreover, when the controller 50 determines that the AC power source $V_{AC}$ is abnormal and before the first power conversion path 31 is enabled, the controller 50 controls to stop the operation of the generator system 20 so as to prevent the built ignition voltage from causing damage to the generator system 20 in operation.

After the generator system 20 is activated by the ignition voltage, the controller 50 disables the first power conversion path 31, and the generator system 20 builds a working voltage on the DC bus $B_{DC}$. That is, the power conversion system 20 has been activated by the ignition voltage built on the DC bus $B_{DC}$ through the first power conversion path 31 so as to operate to generate power electricity. In this condition, since it is no longer necessary to activate the generator system 20 by the uninterruptible power system 10 through the first power conversion path 31, the first power conversion path 31 may be disabled and the working voltage can be built on the DC bus $B_{DC}$ after the generator system 20 operates.

After the working voltage is built on the DC bus $B_{DC}$, the controller 50 enables the second power conversion path 32. After the second power conversion path 32 is enabled, the power conversion system 20 supplies power to the general load $L_2$ through the second power conversion path 32, and supplies power to the critical load $L_1$ through the second power conversion path 32 and the uninterruptible power system 10. That is, since the generator system 20 is sufficient for power generation (is capable of generating power electricity), the generator system 20 supplies power to the general load $L_2$ through the second power conversion path 32, and supplies power to the critical load $L_1$ through the second power conversion path 32 and the uninterruptible power system 10.

When the power conversion system 20 supplies power to the critical load $L_1$ through the second power conversion path 32 and the uninterruptible power system 10, the controller 50 controls the uninterruptible power system 10 operating in a standby mode, and the generator system 10 charges at least one battery of the uninterruptible power system 10. That is, when the generator system 20 is sufficient to supply power to the critical load $L_1$, the critical load $L_1$ may not need to be powered by the uninterrupted power system 10. In this condition, therefore, the uninterrupted power system 10 may enter the standby mode (operate in the standby mode), and at least one of the uninterrupted power system 10 is charged so that the uninterrupted power system 10 can uninterruptedly and normally provide power electricity when needed.

When the controller 50 determines that the AC power source $V_{AC}$ is restored, the controller 50 suspends the operation of the power supply apparatus. During the suspension of operation of the power supply apparatus, the controller 50 enables the second power conversion path 32 and disables the first power conversion path 31 to operate in a grid connection mode. After the operation of the grid connection mode, the controller 50 restores the operation of the power supply apparatus so that the AC power source $V_{AC}$ and the generator system 200 supply power to the critical load $L_1$ and the general load $L_2$ since the uninterrupted power system 10 still operates in the standby mode (since the AC power source $V_{AC}$ has restored to normal). In other words, either the AC power source $V_{AC}$ or the generator system 20 can supply power to the critical load $L_1$ and the general load $L_2$. Moreover, since the uninterrupted power system 10 operates in the standby mode, the AC power source $V_{AC}$ and the generator system 20 can charge at least one battery of the uninterruptible power system 10 while supplying the critical load $L_1$ and the general load $L_2$ stably.

As shown in FIG. 4, the power supply apparatus further includes a capacitor bank 40. The capacitor bank 40 is connected to the DC bus $B_{DC}$ of the power conversion system 20 to stabilize a rotation speed of the generator system 20.

Hereinafter, the specific circuit structure of the first embodiment of the power supply apparatus of the present disclosure will be described in detail below.

Figure 5:
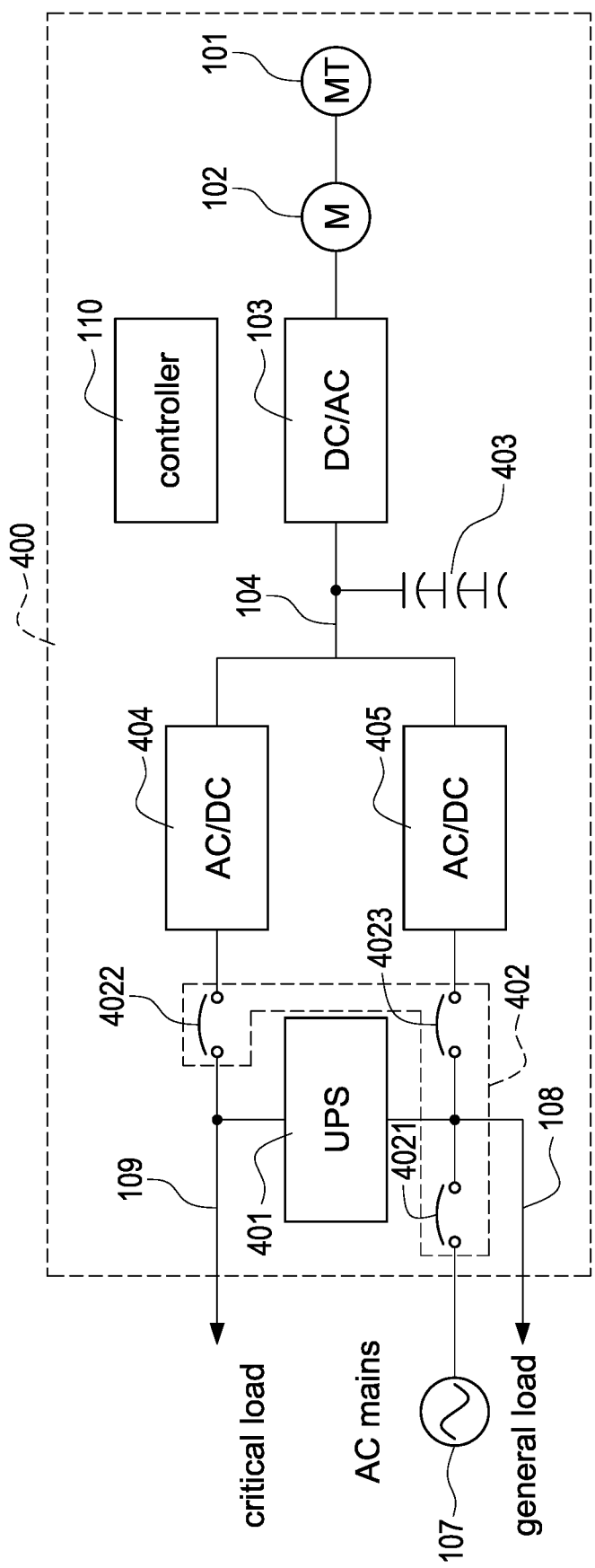
FIG. 5 is a block diagram of a first turbine generator system of the power supply apparatus according to the first embodiment of the present disclosure.

Please refer to FIG. 5, which shows a block diagram of a first turbine generator system of the power supply apparatus according to the first embodiment of the present disclosure. The first turbine generator system includes a micro turbine 101, a generator 102, a DC-AC converter 103 of driving the generator, two AC-DC converters 404,405 of active front-end conversion, an uninterruptible power system (UPS) 401, an AC-side output configuration circuit 402, a capacitor bank 403, and a system controller 110. The system can achieve the grid connection mode (shown in FIG. 6) and the standalone mode (shown in FIG. 7) through the connection/disconnection of the contact switches 4021,4022,4023 of the AC-side output configuration circuit 402.

As shown in FIG. 5, the first power conversion path 31 includes a first switch (i.e., the contact switch 4022) and a first power converter (i.e., the AC-DC converter 404). A first end of the first switch is used as a first end of the first power conversion path 31, a second end of the first switch is connected to a first end of the first power converter, and a second end of the first power converter is used as a second end of the first power conversion path 31. The second power conversion path 32 includes a second switch (i.e., the contact switch 4023) and a second power converter (i.e., the AC-DC converter 405). A first end of the second switch is used as a first end of the second power conversion path 32, a second end of the second switch is connected to a first end of the second power converter, and a second end of the second power converter is used as a second end of the second power conversion path 32. The controller 110 controls the first switch to enable or disable the first power conversion path 31, and controls the second switch to enable or disable the second power conversion path 32.

Figure 6:
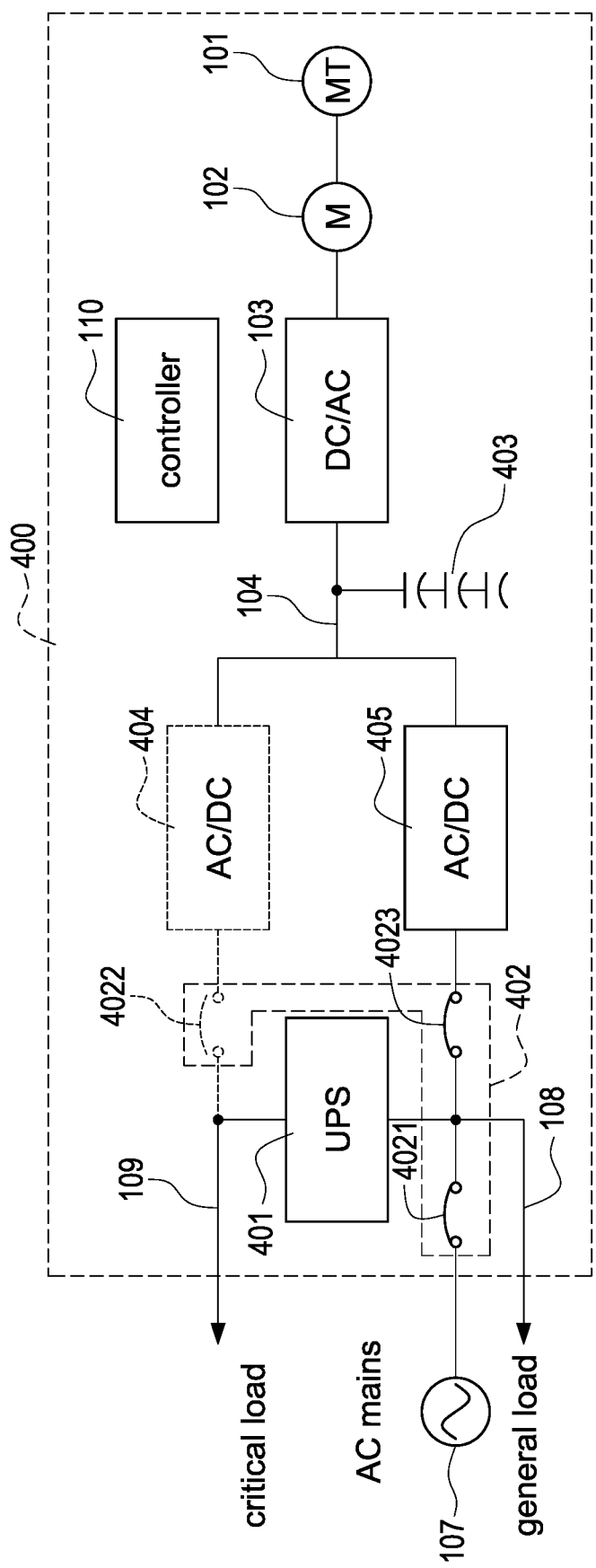
FIG. 6 is a block diagram of the first turbine generator system of the power supply apparatus operating in a grid connection mode according to the first embodiment of the present disclosure.

As shown in FIG. 6, when the micro-turbine generator system operates in a grid connection mode, the contact switch 4021 is turned on, the contact switch 4022 is turned off (shown by dotted lines), and the contact switch 4023 is turned on. In this condition, the micro-turbine generator system refers to the voltage and frequency of a mains 107, and its operation is similar to a current source, and the power electricity generated from the micro-turbine generator set is fed to the mains to supply power to a general load 108 and a critical load 109.

Figure 7:
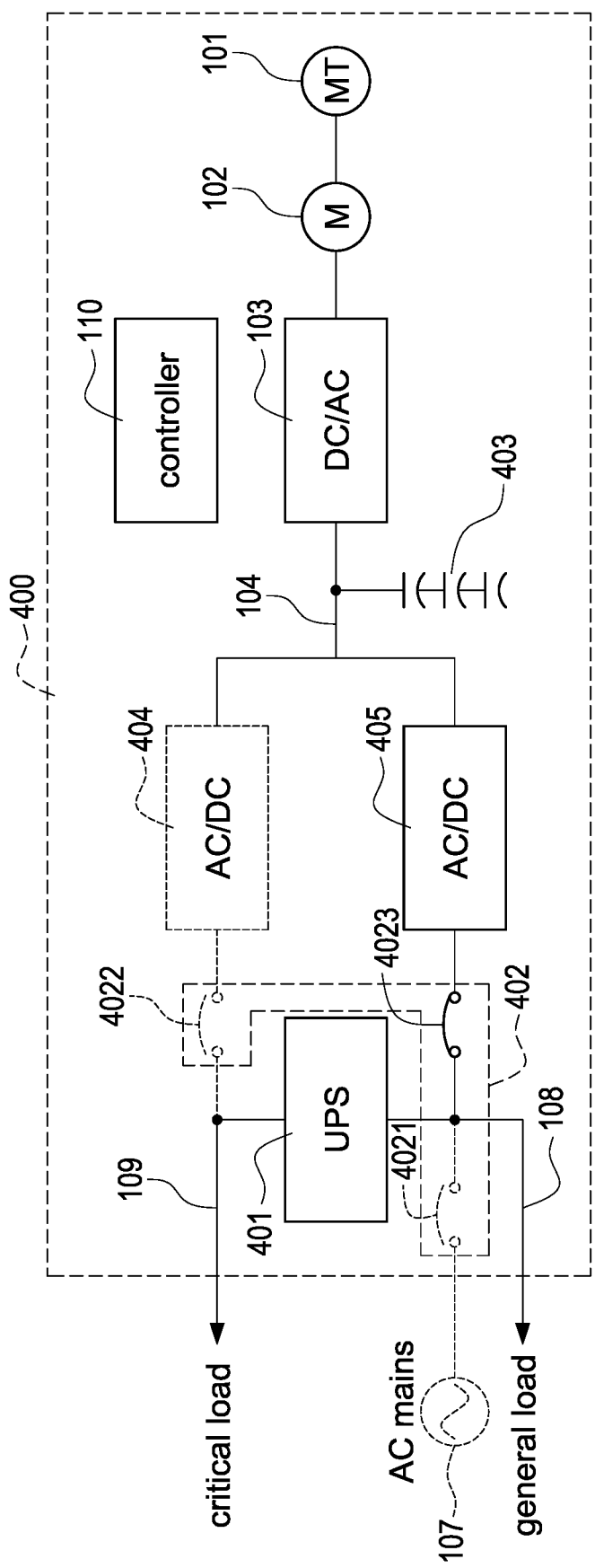
FIG. 7 is a block diagram of the first turbine generator system of the power supply apparatus operating in a standalone mode according to the first embodiment of the present disclosure.

As shown in FIG. 7, when the micro-turbine generator system operates in a standalone mode, since it does not need to be connected with the mains 107 (without grid connection), the contact switch 4021 is turned off (shown by dotted lines), the contact switch 4022 is turned off (shown by dotted lines), and the contact switch 4023 is turned on. In this condition, the micro-turbine generator system forms an independent operation system controlled by a voltage source, and supplies the generated power electricity to the general load 108 and the critical load 109.

However, when the standalone mode is activated (started), since there are no mains as an external power source for starting the generator set, the uninterruptible power system 401 is used as a backup power source for activating (starting) the standalone mode.

Specifically, in the first turbine generator system of the first embodiment of the power supply apparatus according to the present disclosure, the activation (startup) procedure of the standalone mode is divided into the following five steps.

Step 1. Before the startup procedure, the controller 110 turns off the contact switch 4021, turns on the contact switch 4022 (in order to activate the generator through the uninterruptible power system 401), and turns off the contact 4023. In this circuit configuration, since the input-side power of the uninterruptible power system 401 is lost, the uninterrupted power system 401 will automatically operate in an emergency power backup mode to supply power to the critical load 109. In this condition, the AC-DC converter 404 of active front-end conversion starts operating, and a voltage (referred to as a DC bus voltage or an ignition voltage) on a DC bus 104 is built by the power electricity generated from the uninterrupted power system 401.

Step 2. After the voltage on the DC bus 104 is built, the built voltage is used to drive the DC-AC converter 103 operating in a speed control mode to increase the rotation speed of the generator 102. When the rotation speed of the generator 102 reaches to the normal operation speed of the micro turbine 101, the micro turbine 101 is ignited and started to complete the operation of the generator 102.

Step 3. The controller 110 provides a command to turn off the contact switch 4022 (the generator 102 has been started and enters the power generation standby condition), and stops the operation of the AC-DC converter 404, and therefore the adjustment and control (regulation) of the voltage on the DC bus 104 will lose by the AC-DC converter 404. In this condition, the DC-AC converter 103 will automatically change its operation mode and take over the regulation of the voltage of the DC bus 104.

Step 4. The controller 110 provides a command to start operating the AC-DC converter 405 in the standalone mode so as to build a voltage on the AC output side of the system.

Step 5. The controller 110 provides a command to turn on the contact switch 4023 to start supplying the power electricity generated from the turbine generator to the general load 108 to complete starting the standalone mode. Since the input side of the uninterrupted power system 401 restores to the normal operation voltage condition, the uninterrupted power system 401 will automatically switch from the emergency power backup mode to the normal standby mode.

Figure 8B:
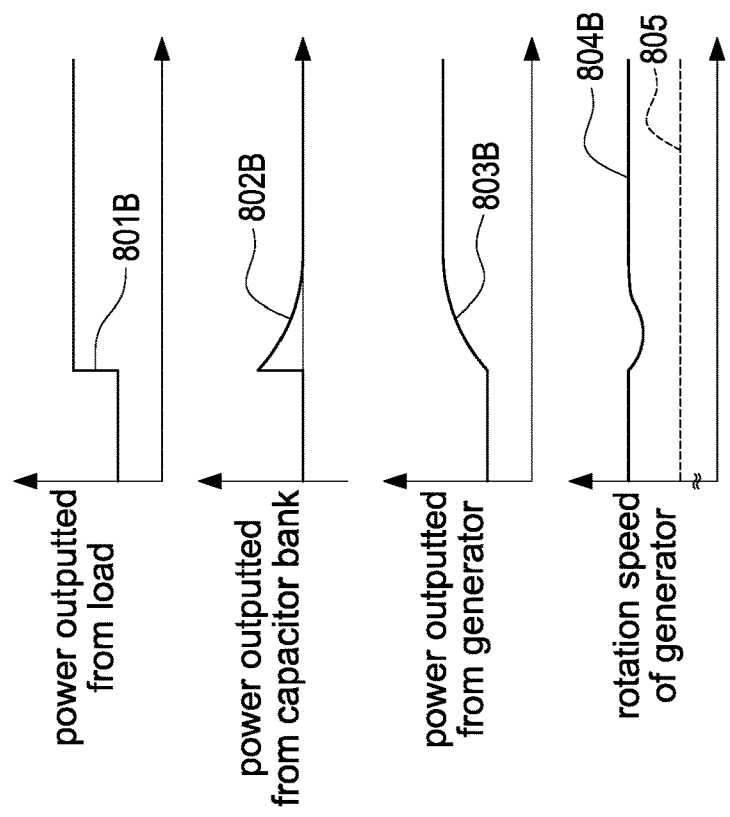
FIG. 8B is a schematic waveform of operating the power supply apparatus in the standalone with using the capacitor bank.
Figure 8A:
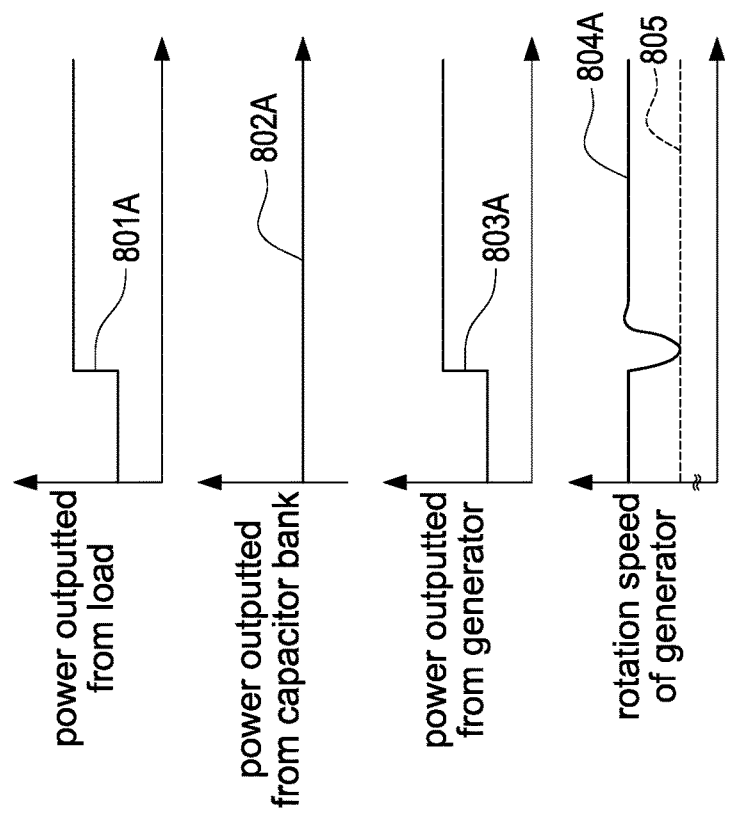
FIG. 8A is a schematic waveform of operating the power supply apparatus in the standalone without using a capacitor bank.

Please refer to FIG. 8A and FIG. 8B, which show a schematic waveform of operating the power supply apparatus in the standalone without using a capacitor bank and a schematic waveform of operating the power supply apparatus in the standalone with using the capacitor bank, respectively. FIG. 8A shows that since the load output power 801A instantly increases, it will instantly extract the increased generator output power 803A from the micro-turbine generator when the turbine generator system increases the output power under the absence of the capacitor bank 403 (i.e., the system does not have the capacitor bank 403 and no power electricity is outputted/provided from the capacitor bank 403). However, the rapid extraction of power electricity from the micro-turbine generator in a short period of time, that is, the instantaneous extraction of too much energy, will cause the generator speed 804A to significantly drop, thereby increasing the risk of generator control failure or its speed exceeding the normal operating range and resulting in unstable operation of the turbine generator system. Compared with the above situation, FIG. 8B shows that since the load output power 801B instantly increases, the capacitor output power 802B of the capacitor bank 403 will be supplemented by the turbine generator system in a short period of time to extract excessive energy when the turbine generator system increases the output power under the configuration of the capacitor bank 403, thereby avoiding the rapid extraction of the generator output power 803B from the micro-turbine generator, which causes a large drop in the micro-turbine generator speed 804B so that the operation of the turbo-generator system is relatively stable.

Figure 9:
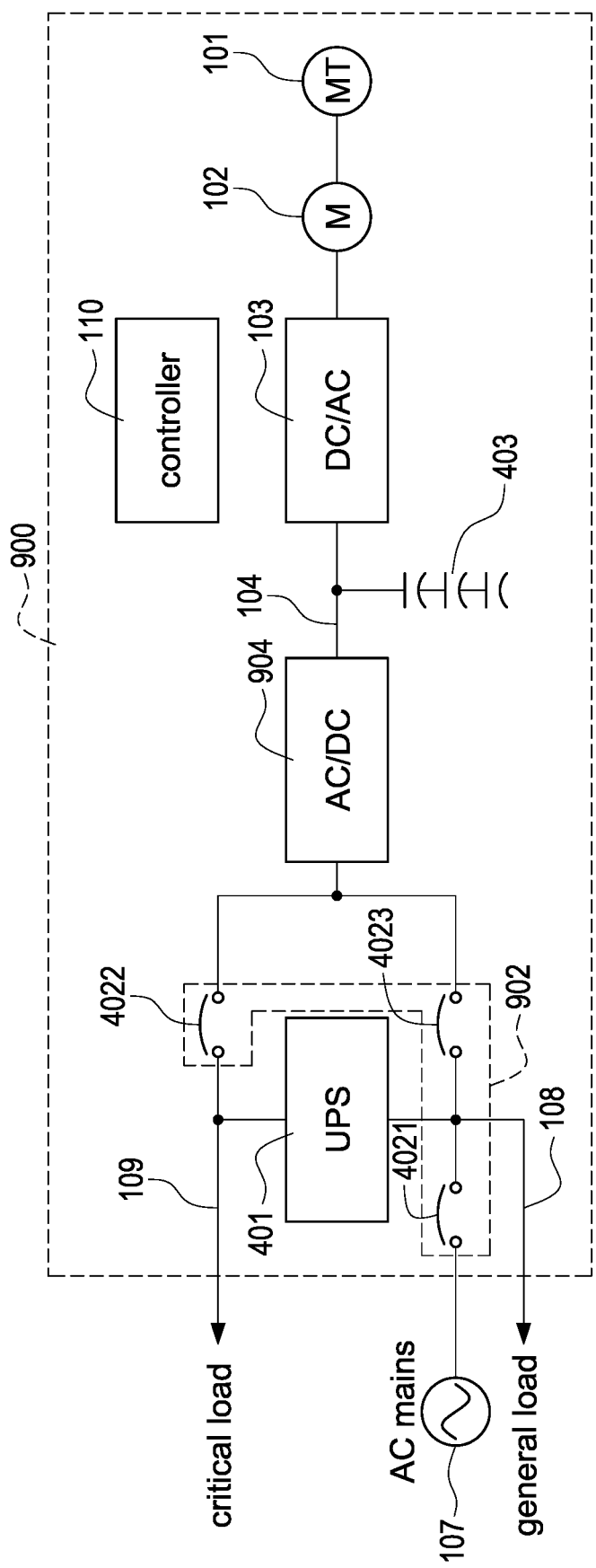
FIG. 9 is a block diagram of a second turbine generator system of the power supply apparatus according to the first embodiment of the present disclosure.

Please refer to FIG. 9, which shows a block diagram of a second turbine generator system of the power supply apparatus according to the first embodiment of the present disclosure. The second turbine generator system includes a micro turbine 101, a generator 102, a DC-AC converter 103 of driving the generator, an AC-DC converter 904 of active front-end conversion, an uninterruptible power system (UPS) 401, an AC-side output configuration circuit 902, a capacitor bank 403, and a system controller 110. The system can achieve the grid connection mode (shown in FIG. 10) and the standalone mode (shown in FIG. 11) through the connection/disconnection of the contact switches 4021, 4022,4023 of the AC-side output configuration circuit 902.

As shown in FIG. 9, the first power conversion path 31 is formed by a first switch (i.e., the contact switch 4022) and a power converter (i.e., the AC-DC converter 904), and the second power conversion path 32 is formed by a second switch (i.e., the contact switch 4023) and the power converter (i.e., the AC-DC converter 904). A first end of the first switch is used as a first end of the first power conversion path 31, a first end of the second switch is used as a first end of the second power conversion path 32, a second end of the first switch and a second end of the second switch are jointly connected to a first end of the power converter, and a second end of the power converter is used as a second end of the first power conversion path 31 and a second end of the second power conversion path 32. The controller 110 controls the first switch to enable or disable the first power conversion path 31, and controls the second switch to enable or disable the second power conversion path 32.

Figure 10:
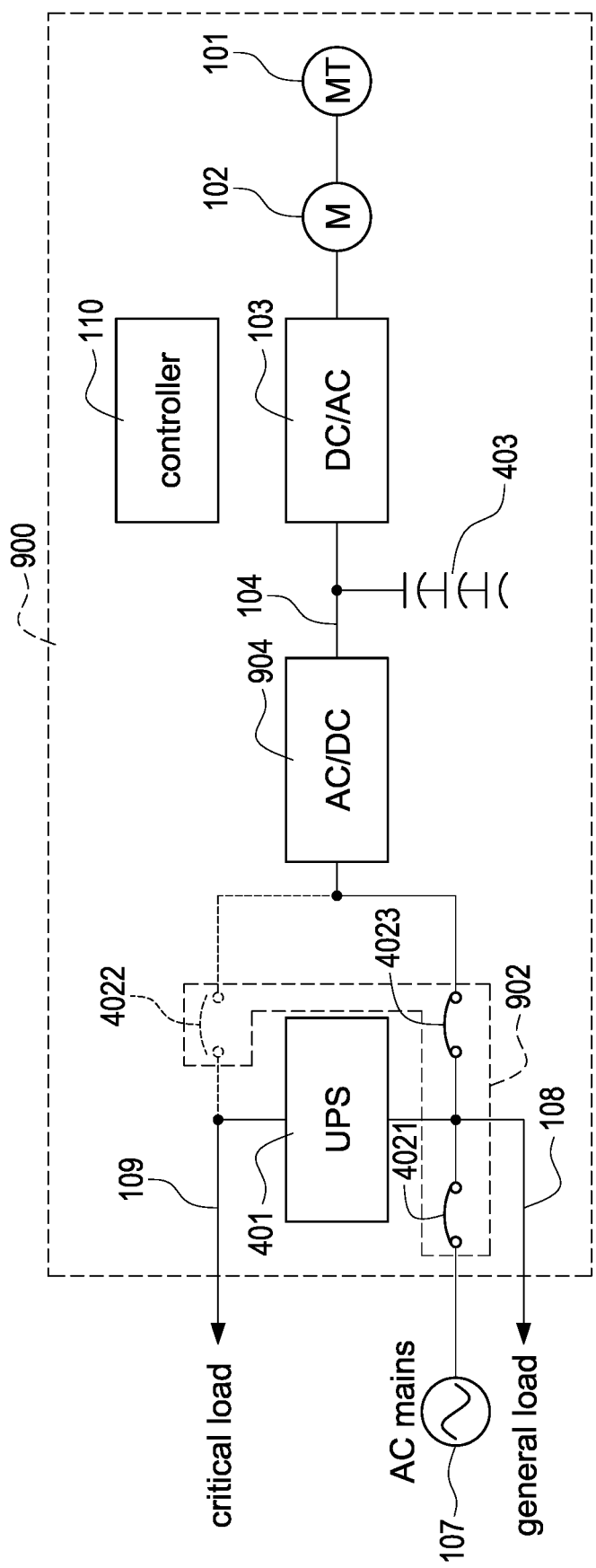
FIG. 10 is a block diagram of the second turbine generator system of the power supply apparatus operating in a grid connection mode according to the first embodiment of the present disclosure.

As shown in FIG. 10, when the micro-turbine generator system operates in a grid connection mode, the contact switch 4021 is turned on, the contact switch 4022 is turned off (shown by dotted lines), and the contact switch 4023 is turned on. In this condition, the micro-turbine generator system refers to the voltage and frequency of a mains 107, and its operation is similar to a current source, and the power electricity generated from the micro-turbine generator set is fed to the mains to supply power to a general load 108 and a critical load 109.

Figure 11:
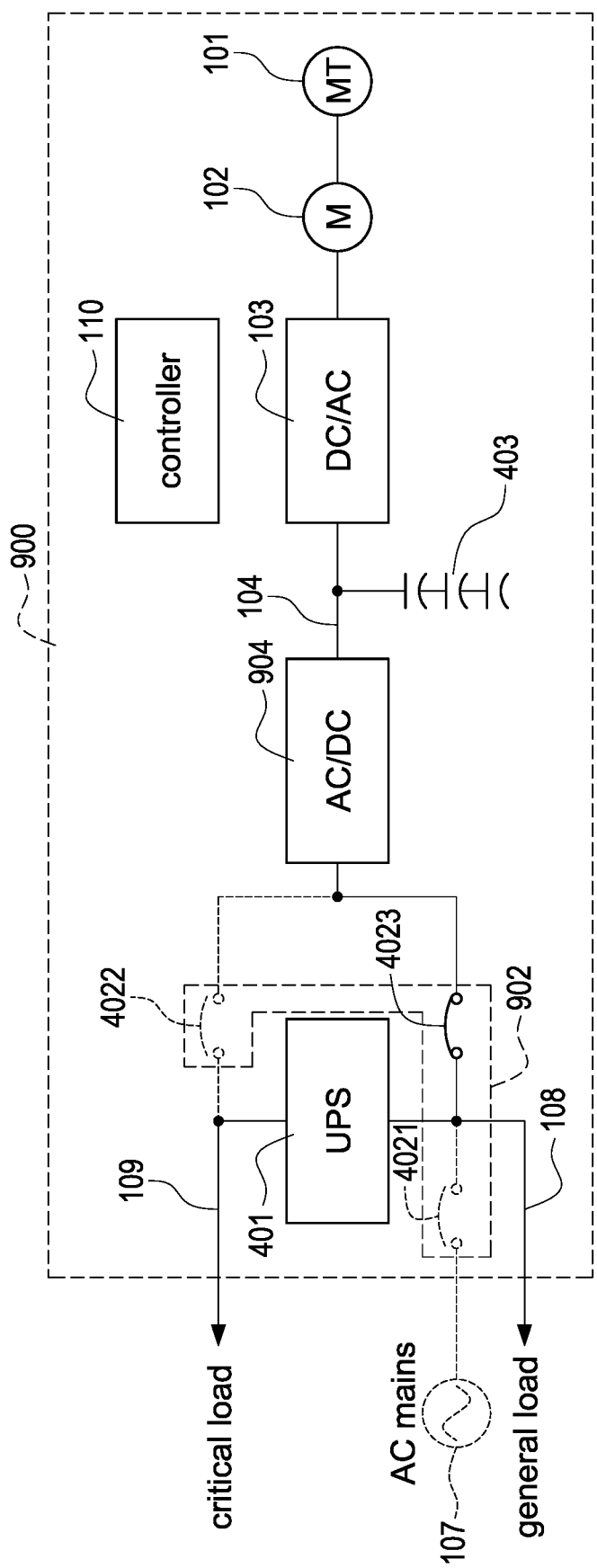
FIG. 11 is a block diagram of the second turbine generator system of the power supply apparatus operating in a standalone mode according to the first embodiment of the present disclosure.

As shown in FIG. 11, when the micro-turbine generator system operates in a standalone mode, since it does not need to be connected with the mains 107 (without grid connection), the contact switch 4021 is turned off (shown by dotted lines), the contact switch 4022 is turned off (shown by dotted lines), and the contact switch 4023 is turned on. In this condition, the micro-turbine generator system forms an independent operation system controlled by a voltage source, and supplies the generated power electricity to the general load 108 and the critical load 109. However, when the standalone mode is activated (started), since there are no mains as an external power source for starting the generator set, the uninterruptible power system 401 is used as a backup power source for activating (starting) the standalone mode.

Specifically, in the second turbine generator system of the first embodiment of the power supply apparatus according to the present disclosure, the activation (startup) procedure of the standalone mode is divided into the following five steps.

Step 1. Before the startup procedure, the controller 110 turns off the contact switch 4021, turns on the contact switch 4022 (in order to activate the generator through the uninterruptible power system 401), and turns off the contact 4023. In this circuit configuration, since the input-side power of the uninterruptible power system 401 is lost, the uninterrupted power system 401 will automatically operate in an emergency power backup mode to supply power to the critical load 109. In this condition, the AC-DC converter 904 of active front-end conversion starts operating, and a voltage (referred to as a DC bus voltage or an ignition voltage) on a DC bus 104 is built by the power electricity generated from the uninterrupted power system 401.

Step 2. After the voltage on the DC bus 104 is built, the built voltage is used to drive the DC-AC converter 103 operating in a speed control mode to increase the rotation speed of the generator 102. When the rotation speed of the generator 102 reaches to the normal operation speed of the micro turbine 101, the micro turbine 101 is ignited and started to complete the operation of the generator 102.

Step 3. The controller 110 provides a command to turn off the contact switch 4022 (the generator 102 has been started and enters the power generation standby condition), and stops the operation of the AC-DC converter 904, and therefore the adjustment and control (regulation) of the voltage on the DC bus 104 will lose by the AC-DC converter 904. In this condition, the DC-AC converter 103 will automatically change its operation mode and take over the regulation of the voltage of the DC bus 104.

Step 4. The controller 110 provides a command to start operating the AC-DC converter 904 in the standalone mode so as to build a voltage on the AC output side of the system.

Step 5. The controller 110 provides a command to turn on the contact switch 4023 to start supplying the power electricity generated from the turbine generator to the general load 108 to complete starting the standalone mode. Since the input side of the uninterrupted power system 401 restores to the normal operation voltage condition, the uninterrupted power system 401 will automatically switch from the emergency power backup mode to the normal standby mode.

Figure 12:
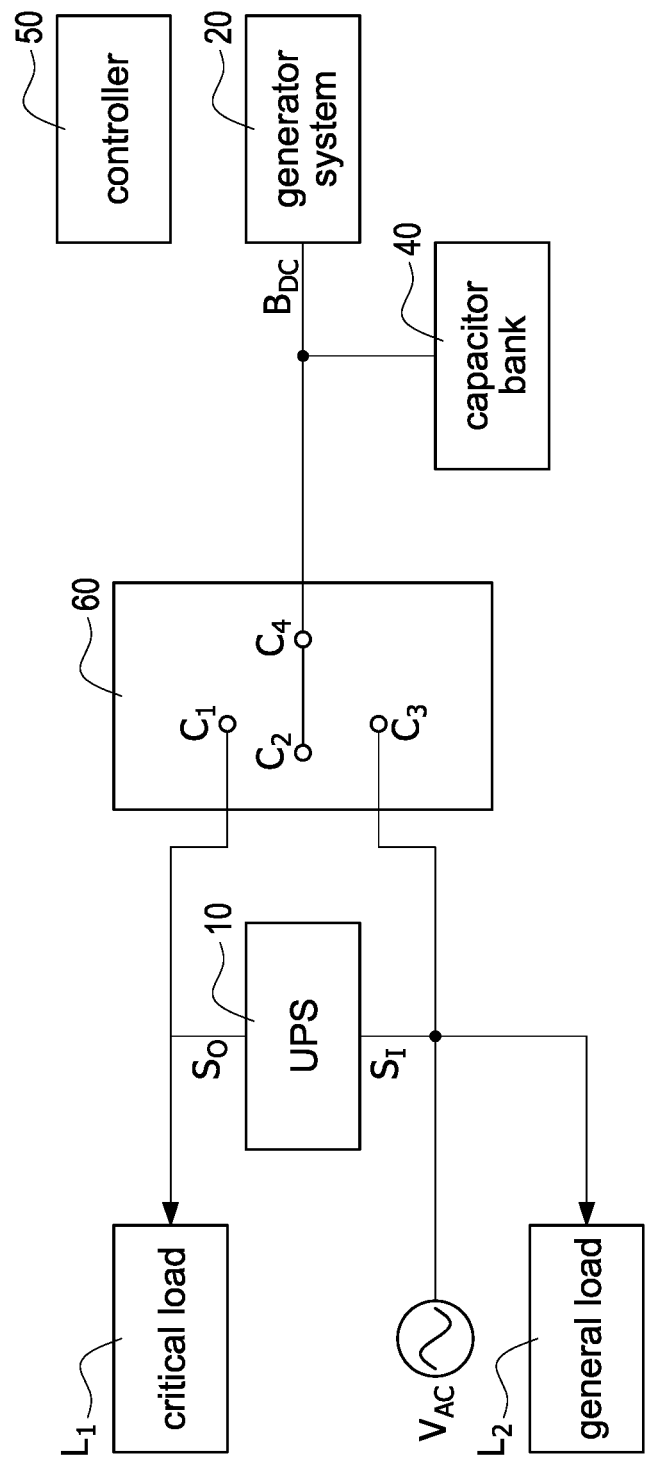
FIG. 12 is a block diagram of the power supply apparatus according to a second embodiment of the present disclosure.
Figure 13:
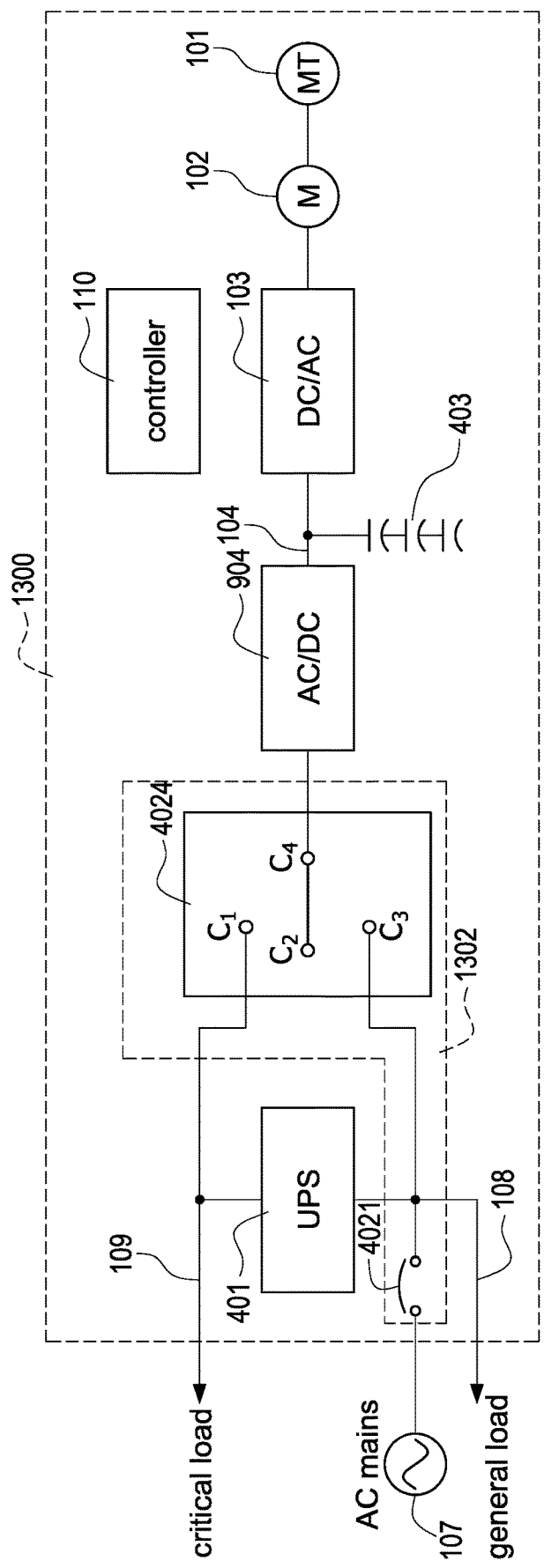
FIG. 13 is a block diagram of a turbine generator system of the power supply apparatus according to the second embodiment of the present disclosure.

Please refer to FIG. 12, which shows a block diagram of the power supply apparatus according to a second embodiment of the present disclosure. The turbine generator system includes a micro turbine 101, a generator 102, a DC-AC converter 103 of driving the generator, an AC-DC converter 904 of active front-end conversion, an uninterruptible power system (UPS) 401, an AC-side output configuration circuit 1302, a capacitor bank 403, and a system controller 110. The system can achieve the grid connection mode (shown in FIG. 14) and the standalone mode (shown in FIG. 15) through the connection/disconnection of the contact switches 4021,4024 of the AC-side output configuration circuit 1302.

Figure 14:
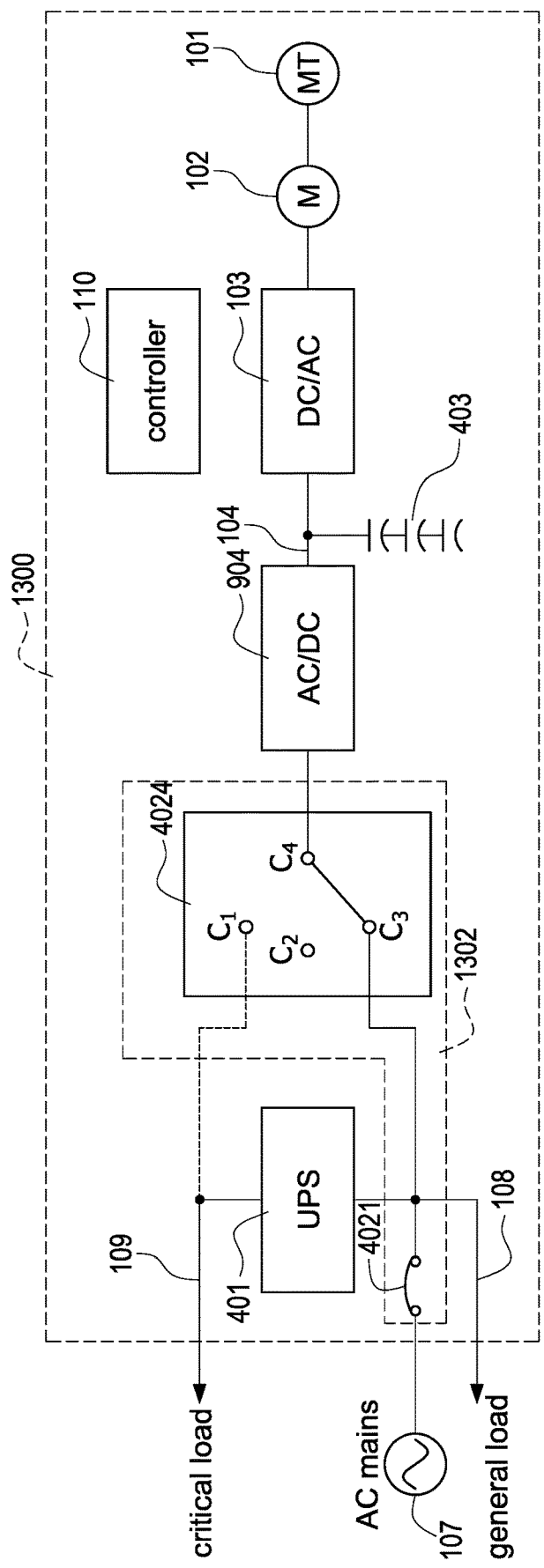
FIG. 14 is a block diagram of the turbine generator system of the power supply apparatus operating in a grid connection mode according to the second embodiment of the present disclosure.

As shown in FIG. 14, when the micro-turbine generator system operates in a grid connection mode, the contact switch 4021 is turned on, and the contact switch 4024 is connected to a contact of an input side of the uninterruptible power system 401. In this condition, the micro-turbine generator system refers to the voltage and frequency of a mains 107, and its operation is similar to a current source, and the power electricity generated from the micro-turbine generator set is fed to the mains to supply power to a general load 108 and a critical load 109.

Figure 15:
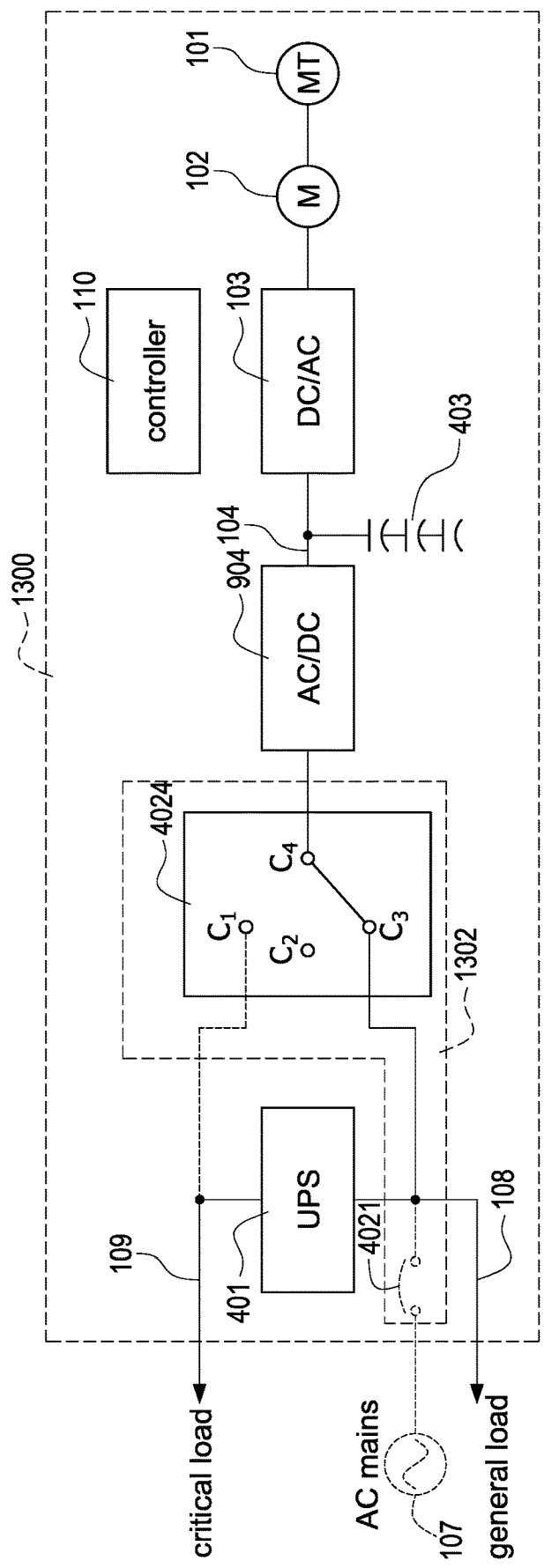
FIG. 15 is a block diagram of the turbine generator system of the power supply apparatus operating in a standalone mode according to the second embodiment of the present disclosure.

As shown in FIG. 15, when the micro-turbine generator system operates in a standalone mode, since it does not need to be connected with the mains 107 (without grid connection), the contact switch 4021 is turned off (shown by dotted lines) and the contact switch 4024 is connected to a contact of an input side of the uninterruptible power system 401. In this condition, the micro-turbine generator system refers to the voltage and frequency of a mains 107, and its operation is similar to a current source, and the power electricity generated from the micro-turbine generator set is fed to the mains to supply power to a general load 108 and a critical load 109. However, when the standalone mode is activated (started), since there are no mains as an external power source for starting the generator set, the uninterruptible power system 401 is used as a backup power source for activating (starting) the standalone mode.

Specifically, in the turbine generator system of the second embodiment of the power supply apparatus according to the present disclosure, the activation (startup) procedure of the standalone mode is divided into the following five steps.

Step 1. Before the startup procedure, the controller 110 turns off the contact switch 4021, turns off the contact switch 4021 and connects the contact switch 4024 to a contact of an output side of the uninterruptible power system 401 (in order to activate the generator through the uninterruptible power system 401). In this circuit configuration, since the input-side power of the uninterruptible power system 401 is lost, the uninterrupted power system 401 will automatically operate in an emergency power backup mode to supply power to the critical load 109. In this condition, the AC-DC converter 904 of active front-end conversion starts operating, and a voltage (referred to as a DC bus voltage or an ignition voltage) on a DC bus 104 is built by the power electricity generated from the uninterrupted power system 401.

Step 2. After the voltage on the DC bus 104 is built, the built voltage is used to drive the DC-AC converter 103 operating in a speed control mode to increase the rotation speed of the generator 102. When the rotation speed of the generator 102 reaches to the normal operation speed of the micro turbine 101, the micro turbine 101 is ignited and started to complete the operation of the generator 102.

Step 3. The controller 110 provides a command to connect the contact switch 4024 to a contact of an open-circuited configuration (the generator 102 has been started and enters the power generation standby condition), and stops the operation of the AC-DC converter 904, and therefore the adjustment and control (regulation) of the voltage on the DC bus 104 will lose by the AC-DC converter 904. In this condition, the DC-AC converter 103 will automatically change its operation mode and take over the regulation of the voltage of the DC bus 104.

Step 4. The controller 110 provides a command to start operating the AC-DC converter 904 in the standalone mode so as to build a voltage on the AC output side of the system.

Step 5. The controller 110 provides a command to turn on the contact switch 4024 to start supplying the power electricity generated from the turbine generator to the general load 108 to complete starting the standalone mode. Since the input side of the uninterrupted power system 401 restores to the normal operation voltage condition, the uninterrupted power system 401 will automatically switch from the emergency power backup mode to the normal standby mode.

In the various embodiments of the present disclosure, the DC-AC converter 103 and the AC-DC converters 404,405, 904 are all bidirectional converters, and the conduction direction of the aforementioned converters may be changed by adjusting different modes by the system controller 110.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply apparatus coupled to an AC power source, a critical load, and a general load, the power supply apparatus comprising:
an uninterruptible power system, comprising an input side and an output side, wherein the input side is connected to the AC power source and the general load, and the output side is connected to the critical load,
a generator system, comprising a DC bus,
a power conversion system, comprising a first power conversion path and a second power conversion path, wherein a first end of the first power conversion path is connected to the critical load and the output side, a first end of the second power conversion path is connected to the general load and the input side, and a second end of the first power conversion path and a second end of the second power conversion path are jointly connected to the DC bus, and
a controller, configured to control disconnecting the AC power source, activate the uninterruptible power system to supply power to the critical load, enable the first power conversion path, and disable the second power conversion path when the controller determines that the AC power source is abnormal,
wherein the uninterruptible power system is configured to build an ignition voltage on the DC bus through the first power conversion path to activate the generator system.

2. The power supply apparatus as claimed in claim 1, wherein after the generator system is completely activated, the controller disables the first power conversion path, and the generator system builds a working voltage on the DC bus.

3. The power supply apparatus as claimed in claim 2, wherein after the working voltage is built on the DC bus, the controller enables the second power conversion path.

4. The power supply apparatus as claimed in claim 3, wherein after the second power conversion path is enabled, the generator system supplies power to the general load through the second power conversion path, and then the second power conversion path and the uninterruptible power system supply power to the critical load.

5. The power supply apparatus as claimed in claim 4, wherein when the generator system supplies power to the critical load through the second power conversion path and the uninterruptible power system, the controller controls the uninterruptible power system operating in a standby mode, and the generator system charges at least one battery of the uninterruptible power system.

6. The power supply apparatus as claimed in claim 1, wherein when the controller determines that the AC power source is abnormal and before the first power conversion path is enabled, the controller controls to stop the operation of the generator system.

7. The power supply apparatus as claimed in claim 1, wherein
when the controller determines that the AC power source is restored, the controller suspends the operation of the power supply apparatus,
during the suspension of operation of the power supply apparatus, the controller enables the second power conversion path and disables the first power conversion path to operate in a grid connection mode, and
after the operation of the grid connection mode, the controller restores the operation of the power supply apparatus so that the AC power source and the generator system supply power to the critical load and the critical load.

8. The power supply apparatus as claimed in claim 7, wherein the controller controls the uninterruptible power system operating in a standby mode, and the AC power source and the generator system charge at least one battery of the uninterruptible power system.

9. The power supply apparatus as claimed in claim 1, further comprising:
a capacitor bank, connected to the DC bus of the generator system to stabilize a rotation speed of the generator system.

10. The power supply apparatus as claimed in claim 1, wherein
the first power conversion path comprises a first switch and a first power converter; a first end of the first switch is used as the first end of the first power conversion path, a second end of the first switch is connected to a first end of the first power converter, and a second end of the first power converter is used as the second end of the first power conversion path, the second power conversion path comprises a second switch and a second power converter; a first end of the second switch is used as the first end of the second power conversion path, a second end of the second switch is connected to a first end of the second power converter, and a second end of the second power converter is used as the second end of the second power conversion path, wherein the controller controls the first switch to enable or disable the first power conversion path, and controls the second switch to enable or disable the second power conversion path.

11. The power supply apparatus as claimed in claim 1, wherein the first power conversion path comprises a first switch and a power converter, and the second power conversion path comprises a second switch and the power converter, wherein a first end of the first switch is used as the first end of the first power conversion path, a first end of the second switch is used as the first end of the second power conversion path, a second end of the first switch and a second end of the second switch are jointly connected to a first end of the power converter, and a second end of the power converter is used as the second end of the first power conversion path and the second end of the second power conversion path, wherein the controller controls the first switch to enable or disable the first power conversion path, and controls the second switch to enable or disable the second power conversion path.

12. A power supply apparatus coupled to an AC power source, a critical load, and a general load, the power supply apparatus comprising:

an uninterruptible power system, comprising an input side and an output side, wherein the input side is connected to the AC power source and the general load, and the output side is connected to the critical load, a generator system, comprising a DC bus, a contact switch, comprising a first end, a second end, a third end, and a fourth end; the first end is connected to the critical load and the output side, the second end is a floating end, the third end is connected to the general load and the input side, and the fourth end is selectively connected to one of the first end, the second end, and the third end, a power converter, connected between the fourth end and the DC bus, and a controller, configured to disconnect the AC power source, activate the uninterruptible power system to supply power to the critical load, and control the fourth end connecting to the first end when the controller determines that the AC power source is abnormal, wherein the uninterruptible power system is configured to build an ignition voltage on the DC bus through the first end, the fourth end, and the power converter to activate the generator system.

13. The power supply apparatus as claimed in claim 12, wherein after the generator system is completely activated, the controller controls the fourth end connecting to the floating end, and the generator system builds a working voltage on the DC bus.

14. The power supply apparatus as claimed in claim 13, wherein after the working voltage is built on the DC bus, the controller controls the fourth end connecting to the third end.

15. The power supply apparatus as claimed in claim 14, wherein after the fourth end is connected to the third end, the generator system supplies power to the general load through the power converter, the fourth end, and the third end, and then the uninterruptible power system supplies power to the critical load.

16. The power supply apparatus as claimed in claim 15, wherein when the generator system supplies power to the critical load through the uninterruptible power system, the controller controls the uninterruptible power system operating in a standby mode, and the generator system charges at least one battery of the uninterruptible power system.

17. The power supply apparatus as claimed in claim 12, wherein when the controller determines that the AC power source is abnormal and before the fourth end is connected to the first end, the controller controls to stop the operation of the generator system.

18. The power supply apparatus as claimed in claim 12, wherein when the controller determines that the AC power source is restored, the controller suspends the operation of the power supply apparatus, during the suspension of operation of the power supply apparatus, the controller controls the fourth end connecting to the third end to operate in a grid connection mode, and after the operation of the grid connection mode, the controller restores the operation of the power supply apparatus so that the AC power source and the generator system supply power to the critical load and the critical load.

19. The power supply apparatus as claimed in claim 18, wherein the controller controls the uninterruptible power system operating in a standby mode, and the AC power source and the generator system charge at least one battery of the uninterruptible power system.

20. The power supply apparatus as claimed in claim 12, further comprising:

a capacitor bank, connected to the DC bus of the generator system to stabilize a rotation speed of the generator system.

* * * * *